(12) United States Patent
Hirano

(10) Patent No.: US 6,570,628 B1
(45) Date of Patent: May 27, 2003

(54) DISPLAY DEVICE HAVING TWO DISPLAY UNITS

(75) Inventor: Yoshihiro Hirano, Saitama (JP)

(73) Assignee: Pioneer Corporation, Tokyo (JP)

( * ) Notice: Subject to any disclaimer, the term of this patent is extended or adjusted under 35 U.S.C. 154(b) by 461 days.

(21) Appl. No.: 09/657,941

(22) Filed: Sep. 8, 2000

(30) Foreign Application Priority Data

Sep. 10, 1999 (JP) .......................................... 11-256953

(51) Int. Cl.$^7$ ..................... G02F 1/1335; G09F 9/00; G09G 3/36
(52) U.S. Cl. ..................... 349/11; 390/461; 390/425.5; 345/87; 349/1
(58) Field of Search .................. 395/87, 905; 390/995, 390/990; 248/920; 399/1, 11, 58; 360/681, 683; 359/629, 670; 340/461, 425.5

(56) References Cited

U.S. PATENT DOCUMENTS

| | | | |
|---|---|---|---|
| 5,640,297 A | * | 6/1997 | Labaze ........................ 361/683 |
| 5,847,685 A | | 12/1998 | Otsuki |
| 6,049,288 A | * | 4/2000 | Kawasaki ................ 340/815.4 |
| 6,100,943 A | * | 8/2000 | Koide et al. ................... 349/11 |
| 6,218,934 B1 | * | 4/2001 | Regan ......................... 340/438 |

FOREIGN PATENT DOCUMENTS

| | | |
|---|---|---|
| DE | 38 42 414 A1 | 6/1990 |
| DE | 197 49 365 A1 | 5/1999 |
| EP | 0 409 232 A2 | 1/1991 |
| EP | 0 511 078 A1 | 7/1993 |

\* cited by examiner

*Primary Examiner*—Toan Ton
(74) *Attorney, Agent, or Firm*—Sughrue Mion, PLLC

(57) ABSTRACT

A display device 1 includes an enclosure 2, a first display unit 3 and a second display unit 6. The enclosure 2 is provided with an opening portion 2a through which the first display unit 3 is loaded/unloaded. The first display unit 3 is movably provided between a loading position where said first display unit is completely loaded in the enclosure and a viewing position where information is visually recognized by a driver. The second unit 6 is pivotally supported at its end potion 6c by a pivotal shaft 7 attached to the enclosure 2. The second display unit 6 includes a display 6a and a frame member 6b. When the first display unit 6 is located at both loading position and the viewing position, an end face 6d of the frame member 6b is opposite to said opening portion 2a of the enclosure.

6 Claims, 10 Drawing Sheets

DISPLAY DEVICE HAVING TWO DISPLAY UNITS

BACKGROUND OF THE INVENTION

1. Field of the Invention

The present invention relates to a display device mounted in a moving body such as a motor vehicle, and having a display portion detachable from a box.

2. Description of the Related Art

Conventionally, a motor vehicle incorporates a display unit equipped with a liquid crystal display panel, such as a television receiver and a car navigation system. The display unit for the car navigation system makes several kinds of indications inclusive of the present location of a vehicle.

The display unit has been demanded to display the information indicated by the car navigation system more clearly and wide variety of items of information of an electric appliance mounted in the vehicle, e.g. operation status and setting status of a car audio (tuner, CD deck, etc) and an air conditioner.

Because of the demand described above, the display unit has a tendency being up-sized. However, this up-sizing has made it difficult to assure the space for installing the display unit.

In order to solve such a problem, the inventors of the present invention proposed the display system as described in JP-A-5-185875 and JP-A-8-332903. The display system disclosed in these publications includes an enclosure or box and a display unit for information display which can be freely loaded/unloaded into/from the enclosure from an opening portion.

The enclosure is attached to an instrument panel or console box in a state where the opening is opposite to a vehicle driver. The display unit is provided so that it can be freely loaded/unloaded into/from the instrument panel or console box.

While the display device is being used, the display unit is unloaded from the enclosure. While it is no being used, The display unit remains loaded in the body. More specifically, while the display device is not used, the end face of the display unit is opposite to the vehicle driver through the opening portion.

Therefore, it was impossible to limit an installing space of in a limited region of the instrument panel or console box effectively.

SUMMARY OF THE INVENTION

An object of the present invention is to provide a display device which can display a wide variety of information such as information for various electric appliances and suppress or effectively use an installing space.

In order to attain the above object, in accordance with the present invention, there is provided a display device comprising: an enclosure; a first display unit provided so that it can be freely loaded from/into the enclosure; a second display unit provided in front of the first display unit in a direction of unloading the first display unit from the enclosure.

In this configuration, since the display device is equipped with the first display unit for displaying various items of information of a car navigation system and the second display unit for displaying other kinds of information such as the setting status of an air conditioner. Therefore, the display device can display a wide variety of information such as the information from various kinds of electric appliances.

Further, the first display unit is provided so that it can be freely loaded/unloaded in/from the enclosure, and the second display unit is arranged in front of the first display unit. The space for installing the first and the second display units can be limited. Accordingly, the space for installing the display device 1 itself can be limited and can be used effectively.

Preferably, the enclosure has an opening portion through which the first display unit is loaded/unloaded, the second display unit includes a display panel for displaying information and a frame member for enclosing the second display panel so that whereby when the first display unit is loaded/unloaded in/from the enclosure, an end face of the frame member is opposite to the opening portion of the enclosure.

In this configuration, the space for installing the second display unit can be suppressed. Hence, the-space for installing the display device itself can be suppressed and can be used effectively.

The above and other objects and features of the invention will be more apparent from the following description taken in conjunction with the accompanying drawings.

DESCRIPTION OF THE PREFERRED EMBODIMENTS

Embodiment 1

Now referring to FIGS. 1 to 8, an explanation will be given of the first embodiment of the invention.

Figure 1:
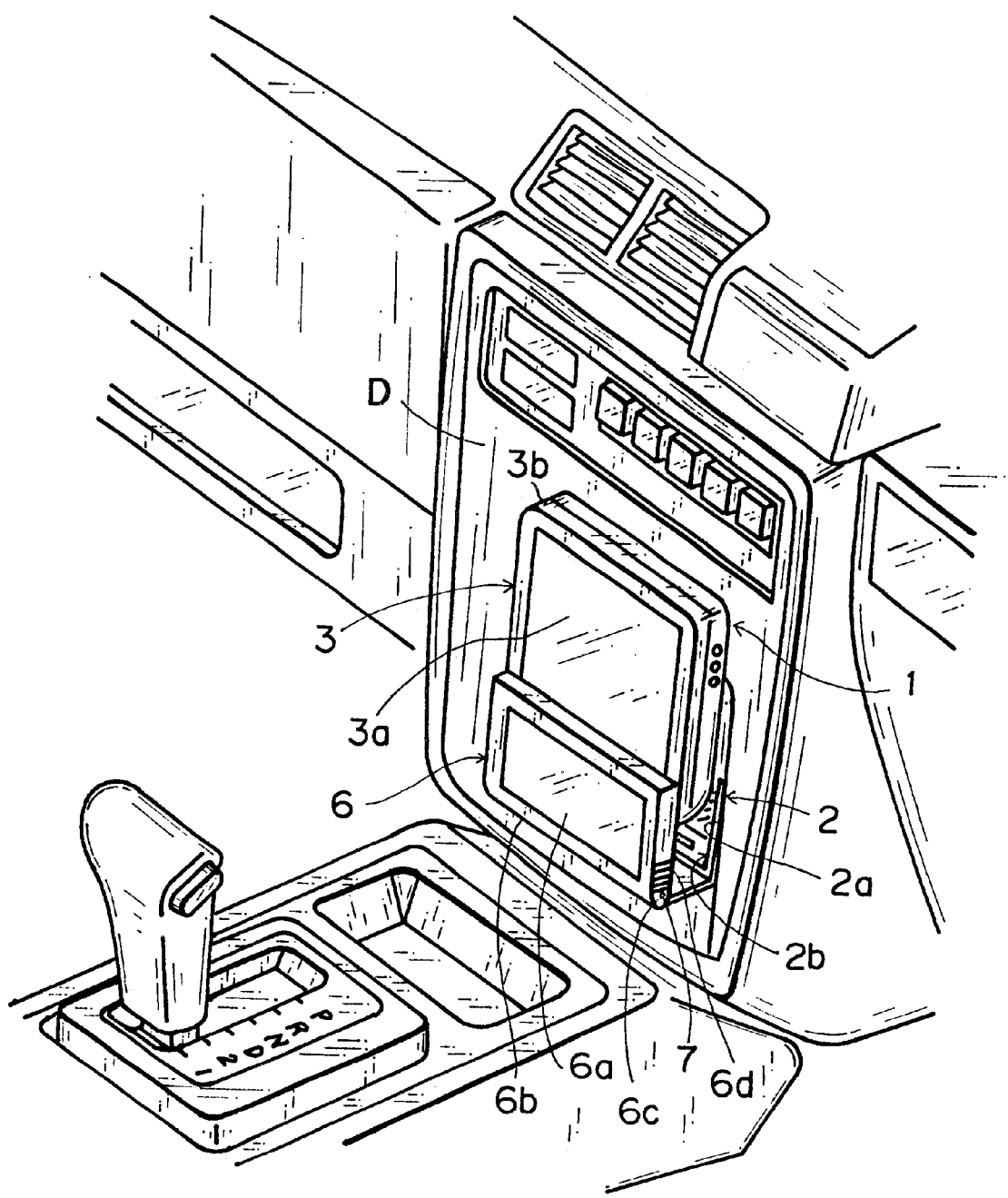
FIG. 1 is a perspective view of an example of the state where the display device according to the first embodiment of the invention is attached.

A display device 1 according to the first embodiment of the invention, shown in FIG. 1 and others, serves to display information for various electric appliances such as a car navigation system and an air conditioner mounted in an instrument panel D of the vehicle which is a moving body.

As seen from FIGS. 1 to 8, the display device 1 includes a box or enclosure 1, a first display unit 3 (a first display portion) which is freely loaded/unloaded into/from the enclosure, a second display unit 6 (a second display portion) first driving mechanism 9 (FIG. 5 and others), etc.

The enclosure 1, as seen from FIGS. 1 to 4, is box-shaped which is mounted in an instrument panel D or the like. The enclosure 2 includes an opening portion 2a opposite to the section of a vehicle occupant when it is mounted in the instrument panel and an operation switch (not shown). The first display unit 3 is loaded/unloaded into/from the enclosure 1 through the opening portion 2a.

When the enclosure 1 is mounted in the instrument panel D, a room 2b where an electric appliance is accommodated is formed below the opening portion 2a. The room 2b accommodates an electric appliance 10 such as a tuner of a car audio or a CD deck. In the illustrated example, the CD deck is accommodated. The room 2b has an open wall opposite to the driver so that the electric appliance 10 can be operated.

A pivotal shaft 7 is provided in the vicinity of the lower edge of the opening portion 2a of the enclosure 1. The pivotal shaft 7 is extended widthwise of the opening portion 2a and the enclosure 2. The pivotal shaft 7 is located at a position protruding from the peripheral edge of the enclosure 2 toward the driver. The pivotal shaft 7 is supported by a bottom member 8 attached to the enclosure 2.

The first display unit 3 includes a display panel 3a (e.g. liquid crystal display panel) for displaying the information such as a character and an image for a driver, and an enclosure or frame member 3b for accommodating the first display panel. The display panel 3a serves to display the various items of information of the car navigation system and serves as a display portion of a television receiver. The frame member 3b has a size enough to be accommodated in the enclosure 2.

The first display unit 3 is loaded in the enclosure 2 so that the display panel 3a is oriented downward. The first display unit 3 is supported by the first driving mechanism 9 so that it can be freely loaded/unloaded into/from the enclosure 2.

The second display unit 6 includes a display panel 6a (e.g. liquid crystal panel) for displaying the information such as a character and an image for a driver, and an enclosure or frame member 6b for accommodating the display panel 6a. The display panel 6a serves to display the various items of information such as the setting status of a CD deck which is an electric appliance and various items of information such as the setting information and the operating information of an air conditioner. The frame member 6b is shaped like a square box when viewed from the front.

The second display unit 6 is arranged so that the display panel 6a is opposite to the driver 6a and lengthy horizontally when viewed from the driver. The second display unit 6 is formed so that its display panel 6a has a smaller size than the display panel 3a. The second display unit 6 is pivotally supported at its lower edge 6c by the pivotal shaft 7.

The second display unit 6 is pivotally supported by the pivotal shaft 7 so that the opening portion 2a can be freely opened/closed. The second display unit 6 is urged by an urging means such as a spring (not shown) in a direction of closing the opening portion 2a around the pivotal shaft 7.

The second display unit 6 is pivotally supported by the pivotal shaft 7 so that it is located in front of the first display unit 3 when the first display unit 3 is located at both positions of a loading position and a viewing position (described later) in a direction of unloading the display unit 3 from the enclosure 2.

The second display unit 6 is located in its end face 6d, which is located on the side opposite to the display panel 6a, oppositely to the opening portion 2a by the urging force of the urging means such as the spring when the first display unit 3 is located at the viewing position described later or loading position. The secondary display unit 6 is held with the end face 6d in contact with the peripheral edge of the enclosure 2 constituting the opening portion 2a.

Figure 5:
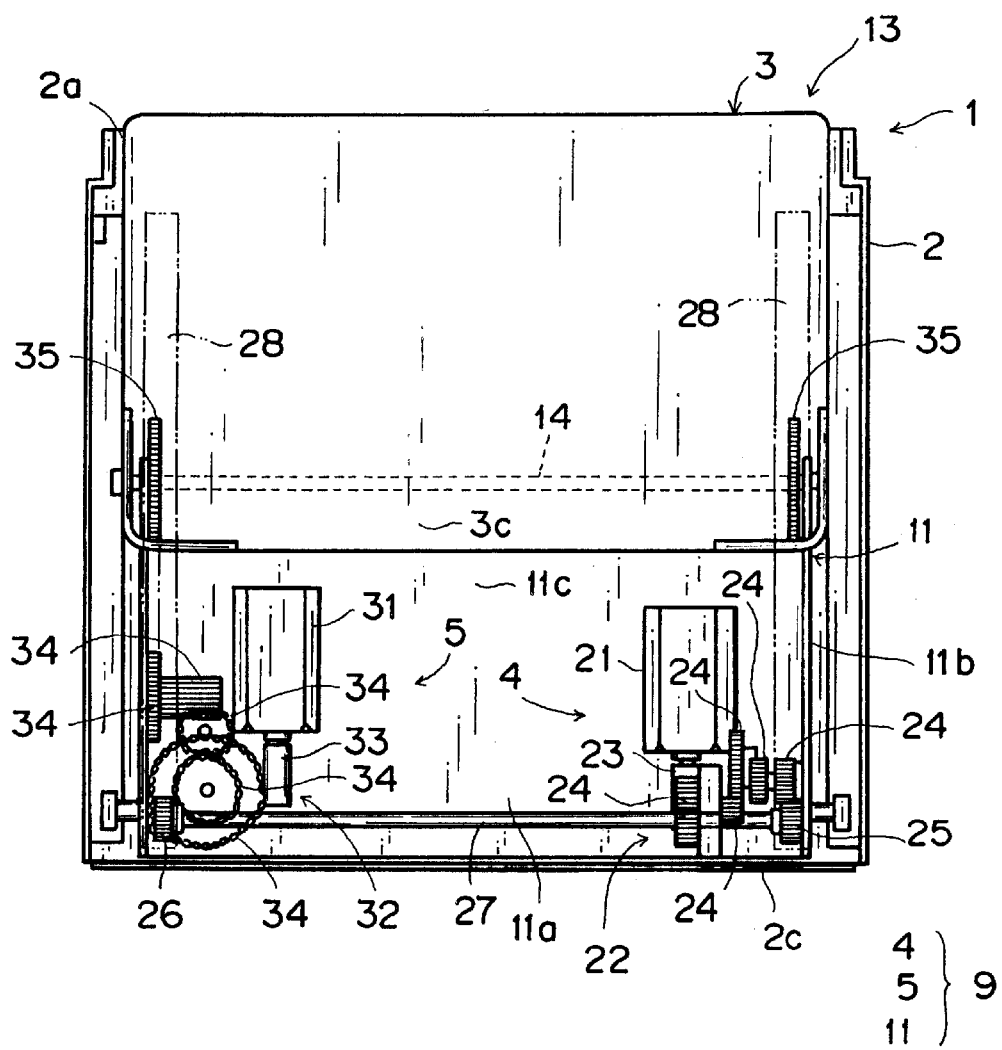
FIG. 5 is a plan view of the display device according to the first embodiment of the invention.
Figure 7:
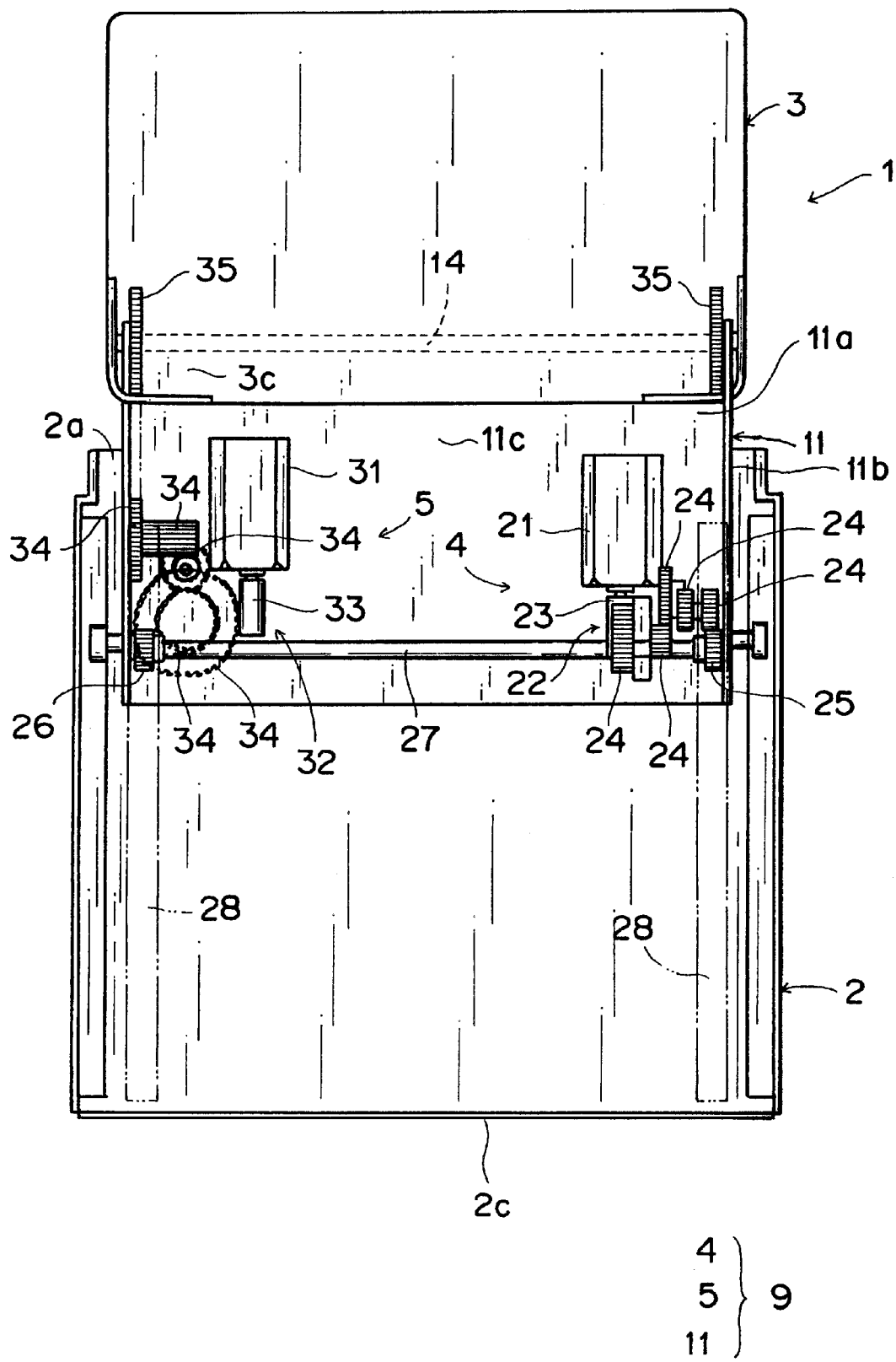
FIG. 7 is a plan view of the state where the first display unit has been unloaded from the box of the display device according to the first embodiment.

The first driving mechanism 9 includes a sub-chassis 11, a shifting mechanism 4 and a first rotary supporting mechanism 5. The sub-chassis 11, as shown in FIGS. 5 and 7, is attached to the outside of the frame member 3b of the first display unit 3.

Figure 6:
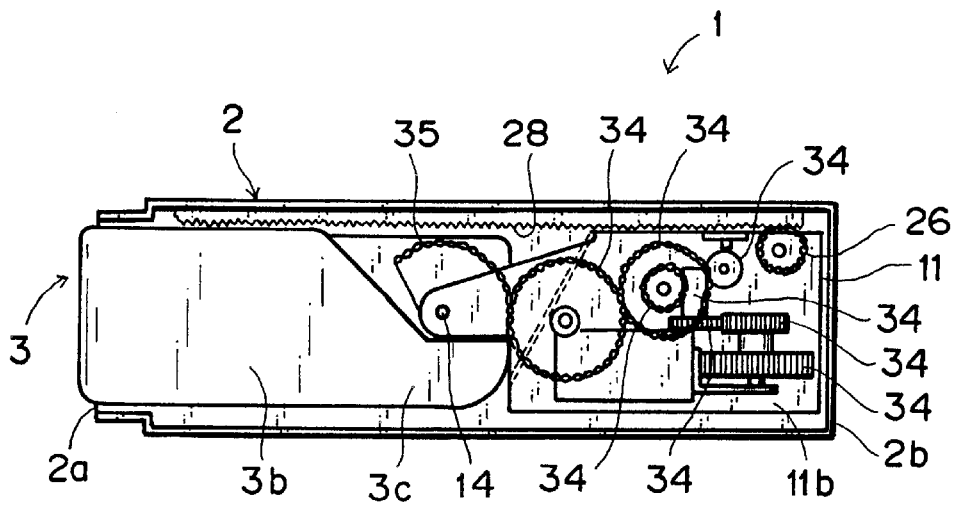
FIG. 6 is a left side view of the display device in the state shown in FIG. 5.
Figure 8:
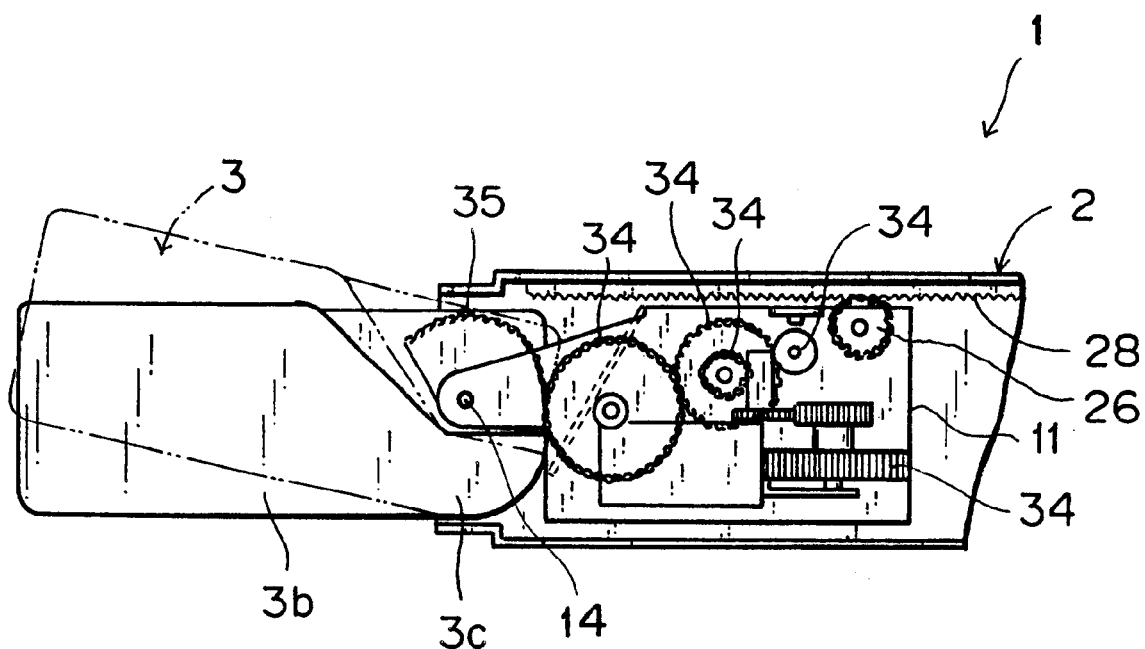
FIG. 8 is a left side view of the display device in the state shown in FIG. 7.

The sub-chassis 11, as seen from FIGS. 6 and 8, includes a chassis bottom wall 11a opposite to the bottom wall of the enclosure member 3a and chassis side walls 11b opposite to the side walls successive to the bottom wall of the frame member 3a.

The sub-chassis 11 is arranged to cover the frame member 3a from its outer periphery. When the first display unit 3 is loaded within the enclosure 2, the sub-chassis 11 extends from the end 3c at the inside of the first display unit 3 to the inner wall 2b of the enclosure 2 which is farthest from the driver 2b.

The sub-chassis 11 is supported shiftably by the shifting mechanism 4 in the depth direction of the enclosure 2 between state where the display unit 3 is loaded in the enclosure 2 and the state where it is unloaded from the enclosure 2 through the opening portion 2a.

The sub-chassis 11 is equipped with a pivotal shaft 14 at the end 11c (FIGS. 5 and 7) located on the side of the driver. The pivotal shaft 14 extends widthwise of the enclosure 2 or display device 1. The pivotal shaft 14 supports the one end 3c of the first display unit 3. Incidentally, in the state (FIG.

4) where the display panel 3a is opposite to the driver, the one end 3c is located at the bottom of the frame member 3b. In the state (FIG. 3) where the display panel 3a is oriented downward, the one end 3c is located at the inner side of the frame member-3b.

The pivotal shaft 14 is rotatably provided around the axis of the sub-chassis 11 and also secured to the first display unit 3. Namely, the pivotal shaft 14 is rotated together with the first display unit 3 and independently of the sub-chassis 11.

The shifting mechanism 4 serves to move the sub-chassis 11 in the depth direction of the enclosure 2. The shifting mechanism 4 moves the sub-chassis 11 so that the first display unit 3 is loaded/unloaded in/from the enclosure 2.

The shifting mechanism 4, as seen from FIGS. 5 and 7, includes a driving motor 21 and a sliding mechanism 22. The driving motor 21 is attached to the sub-chassis 11, and is equipped with a worm gear 23 at its output shaft.

The sliding mechanism 22 includes a plurality of gears 24 in mesh with one another, a shifting gear 15 in mesh with one of these gears 24, a slave gear 26 in parallel to the shifting gear 25, a coupling shaft 27 for coupling the shifting gear 25 and slave gear 26 with each other and a pair of racks 28.

Another of the gears 24 is in mesh with the worm gear 23. The shifting gear 25 and the slave gear 26 are arranged apart from each other widthwise of the display device 1. The coupling shaft 27 is rotatably supported by the sub-chassis 11.

The pair of racks 28 are arranged apart from each other widthwise of the display device 1. The racks 28 are secured to the enclosure 2, respectively. These racks 28 are arranged in the depth direction of the enclosure 2. The one of the racks 28 is in mesh with the shifting gear 25, whereas the other thereof is in mesh with the slave gear 26.

In the configuration described above, the shifting mechanism 4 makes e.g. a normal rotation of the driving motor 21 so that the sub-chassis 11 is shifted together with the first display unit 3 in a depth direction of the enclosure 2 outside the enclosure 2 from the state it has been loaded in the enclosure 2. On the other hand, the shifting mechanism 4 makes e.g. a reverse rotation of the driving motor 21 so that the sub-chassis 11 is shifted together with the display unit 3 into the enclosure 2 from the state where it has been unloaded from the enclosure 2.

The first rotary supporting mechanism 5 includes a first driving motor for rotation (rotary driving motor) 31 and a first rotary mechanism 32. The first rotary driving motor 31 is attached to the sub-chassis 11, and is equipped with a worm gear 33 at its output shaft.

The first rotary mechanism 32 includes a plurality of gears 34 which are in mesh with one another and driving gears 35 coaxially attached to the above pivotal shaft 14. The driving gears 35 rotate together with the pivotal shaft 14. One of the plurality of gears 34 is in mesh with the worm gear 33 and another thereof is in mesh with one of the driving gears 35.

In the configuration described above, the first rotary supporting mechanism 5 makes e.g. a normal rotation of the first rotary driving motor 31 so that the display unit 3 unloaded from the enclosure 2 by the shifting mechanism 4 is rotated around the one end 3c of the display unit 3 so that the display panel 3a is rotated from the state it is oriented downward to the state where it is opposite to the front of an occupant section or the driver.

On the other hand, the first rotary supporting mechanism 5 makes e.g. a reverse rotation of the first rotary driving motor 31 so that the display panel 3a is rotated around the one end 3c of the display unit 3 from the state where it is opposite to the driver to the state where the it is oriented downward.

In the configuration described above, the first driving mechanism 9 supports the first display unit 3 so as to be movable between the loading position where it is loaded in the enclosure 2 and a viewing position where the information on the display panel 3a is presented for the visual recognition of the driver.

Figure 2:
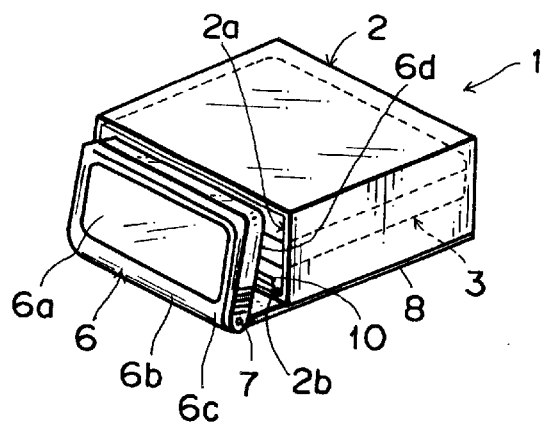
FIG. 2 is a perspective view of the state where a first display unit is loaded in a box of the display device according to the first embodiment.

In the configuration of the display device described above, in the state where the first display unit 3 is located at the above loaded position, as shown in FIG. 2, the end face 6d of the second display unit 6 is opposite to the opening portion 2a. At this time, the display panel 6a is opposite to the driver and the end face 6d is in contact with the peripheral edge of the enclosure 2 constituting the opening portion 20.

When the operation switch is operated, the driving motor 21 is rotated in a normal direction so that the first display unit 3 as well as the sub-chassis 11 is unloaded or discharged from the enclosure 2. As the first display unit 3 is unloaded from the enclosure 2, the first display unit 3 pushes the second display unit 6 against the urging force of the urging means such as a spring. Then, the second display unit 6 is rotated around the pivotal shaft 7 in a direction of opening the opening portion 2a.

Figure 3:
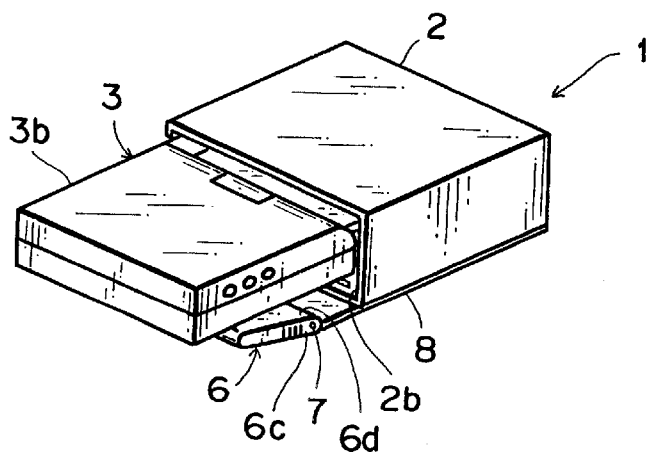
FIG. 3 is a perspective view of the state where the first display unit is unloaded from the box of the display device according to the first embodiment.

As shown in FIG. 3, when the first display unit 3 is completely unloaded from the enclosure 2, the driving motor 21 stops. At this time, the display panel 3a of the first display unit 3 is oriented downward.

Thereafter, the first rotary driving motor 31 is rotated in the normal direction so that the first display unit 3 is rotated for the sub-chassis 11 around the pivotal shaft 14. Thus, the display panel 3a is located at the viewing position where the information on the display panel 3a is presented for the visual recognition of the driver.

In this case, as the first display unit 3 is rotated around the pivotal shaft 14, the second display unit 6 is gradually rotated around the pivotal shaft 7 in a direction so as to make the display panel 6a opposite to the driver. Eventually, as shown in FIG. 4, the first and second display units 3 and 6 are located at the positions where the driver can visually recognize the information displayed on the display panels 3a and 6a.

Figure 4:
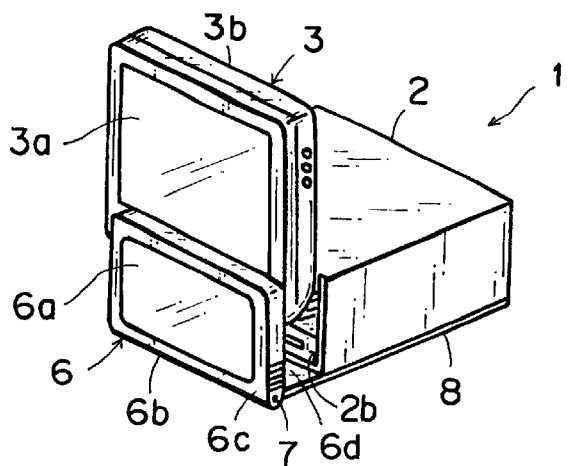
FIG. 4 is a perspective view of the state where the first display unit of the display device according to the first embodiment of the invention has been rotated to an angle easy to see.

When the operation switch is operated in the state of the display units 3 and 6 shown in FIG. 4, the first rotary driving motor 31 starts to rotate in a reverse direction, for example.

Then, the first display unit 3 gradually rotates around the pivotal shaft 14 in a direction so as to orient the display panel 3a downward. In this case, the second display unit 6 is pushed by the first display unit 3 so that it gradually rotates in a direction so as to orient the display panel 6a downward.

Thus, the first rotary driving motor 31 stops when the display units 3 and 6 have been rotated until the display panels 3a and 6a are completely oriented downward. At this time, the second display unit 6 is in a state of having opened the opening portion 2a. Then, the first rotary driving motor 31 starts to rotate in a reverse direction, for example. Correspondingly, the first display unit 3 is shifted into the enclosure 2 and eventually loaded therein.

As the first display unit 3 is shifted into the enclosure 2, the second display 6 gradually rotates around the pivotal shaft 7 in a direction so as to make the display panel 6a opposite to the driver.

When the first display unit 3 has been completely loaded in the enclosure 2, as shown in FIG. 2, the second display unit 6 is located so that the display panel 6a is opposite to the driver. At this time, the end face 6d of the second display unit 6 is opposite to the opening portion 2a.

The display device according to this embodiment provides the following advantages. Since it is equipped with the first display unit 3 for displaying various items of information of the car navigation system and the second display unit 6 for displaying other kinds of information such as the setting status of an air conditioner, it can display a wide variety of information such as the information from various kinds of electric appliances.

The first display unit 3 is provided so that it can be freely loaded/unloaded in/from the enclosure 2, and the second display unit 6 is arranged in front of the first display unit 3. The space for installing the first and the second display units 3 and 6 can be limited. Accordingly, the space for installing the display device 1 itself can be limited and can be used effectively.

When the first display unit 3 is located at both loading position and viewing position, the end face 6d of the frame 6b of the second display unit 6 is opposite to the opening portion 2a. Therefore, the space for installing the second display unit 6 can be limited. Accordingly, the space for installing the display device 1 itself can be limited and can be used effectively.

Further, when the first display unit 3 is located at both loading position and viewing position, the second display unit 6 is located so that the display panel 6a is opposite to the driver. Therefore, when the first display unit 3 is not used, several items of information of an electric appliance such as an air conditioner can be displayed on the display panel 6a of the second display unit 6.

Irrespectively of whether the first display unit 3 is located at the loading position or at the viewing position, various items of information of the electric appliance can be displayed on the display panel 6a. For this reason, the space for installing the display device itself can be used more effectively.

The second display unit 6 is pivotally supported on the pivotal shaft 7 arranged widthwise of the enclosure 2 so that it is urged in a direction of closing the opening portion 2a. For this reason, the space for installing the second display unit 6 can be limited effectively.

As the first display unit 3 is shifted from the loading position to the viewing position and vice versa by the first driving mechanism 9, it pushes the second display unit 6 to rotate so that the opening portion 2a is opened. Thus, the first display unit 3 can be surely loaded/unloaded in/from the enclosure 2.

Since the display panel 6a of the first display unit 6 is formed in a smaller size than that of the display panel 3a of the first display unit 3, the space for installing these display units can be limited and hence the space for installing the display device itself can be limited. Thus, the display device 1 can be provided which can display a wider variety of items of information and limit the space therefor.

Embodiment 2

Now referring to FIGS. 9 to 20, an explanation will be given of the second embodiment of the invention. In these figures, like reference numerals refer to like elements in the first embodiment.

Figure 12:
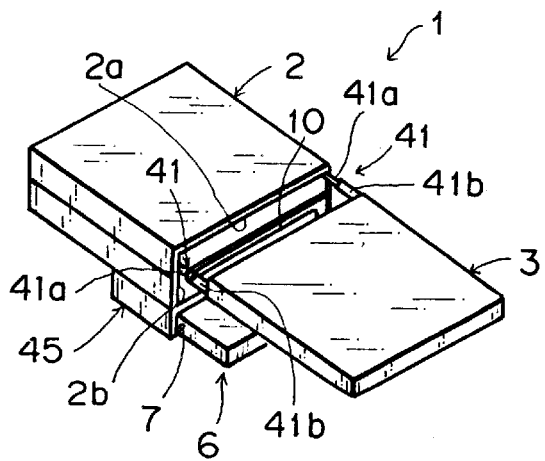
FIG. 12 is a perspective view of the state where the first display unit has been unloaded from the box of the display device according to the second embodiment.
Figure 18:
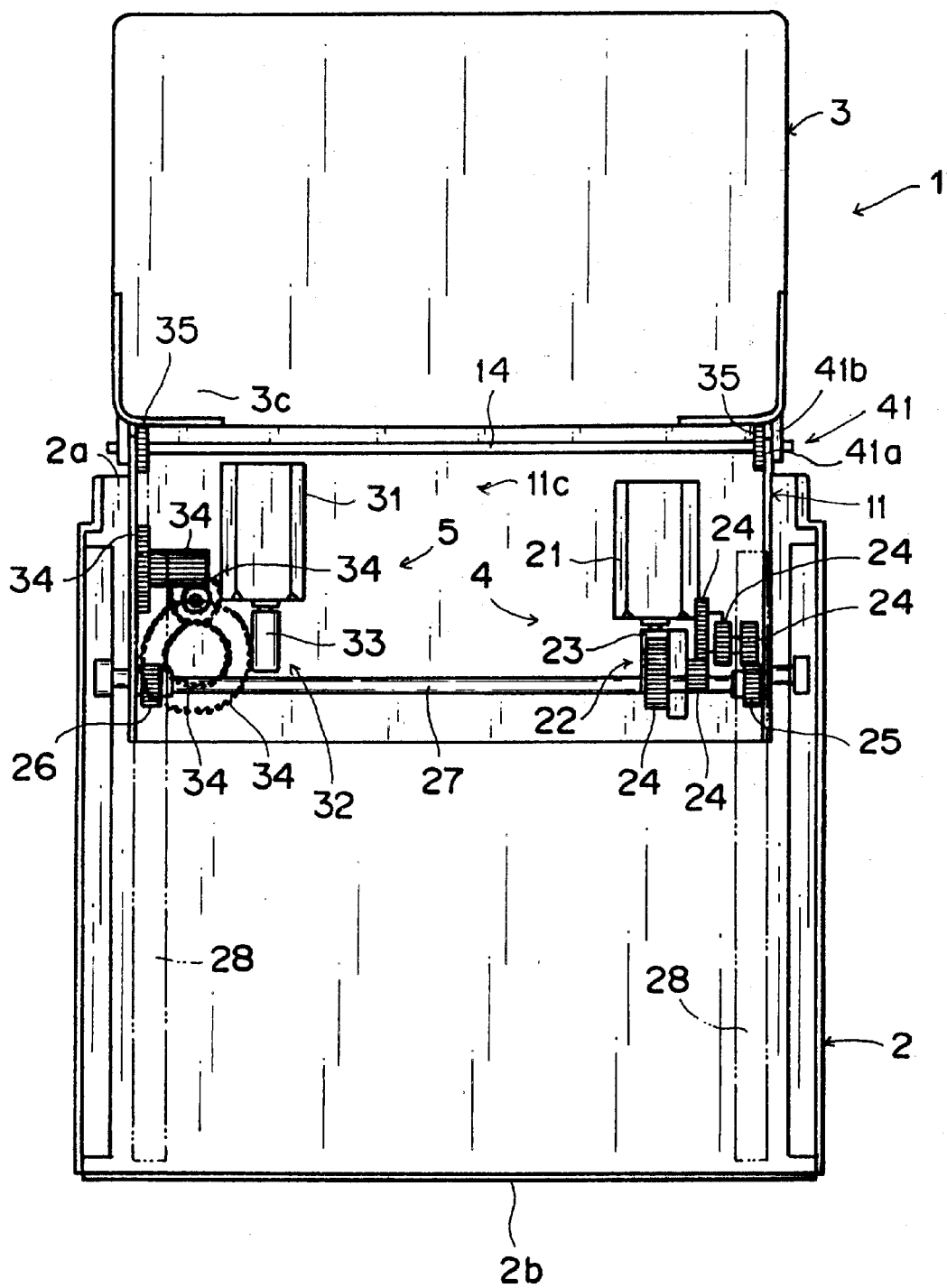
FIG. 18 is a plan view of the state where the first display unit has been unloaded from the box of the display device according to the second embodiment.

In this embodiment, the first display unit 3, as shown in FIGS. 12 and 18, is supported on the sub-chassis 11 by a plurality of hinge means 41. The hinge means 41 are arranged apart from each other widthwise of the display device 1.

Each hinge means 41, as seen from FIGS. 12 and 18, includes a first hinge piece 41a attached to the sub-chassis 11 and a second hinge piece 41b attached to the first display unit 3. These hinge pieces 41a and 41b are formed in a belt-shape.

As seen from FIG. 18, the one end of the first hinge piece 41a is attached to the end 11c of the sub-chassis 11, and the one end of the second hinge piece 41b of the one end 3c of the first display unit 3. These hinge pieces 41a and 41b are coupled with each other so that their other ends are rotatable.

The second hinge piece 41b is coupled with the pivotal shaft 14 and driving gear 35 and is rotated together with them. In the configuration, when the first rotary driving motor 31 is driven, the first display unit 3 is rotated around the pivotal shaft 14 together with the second hinge piece 41b.

Figure 19:
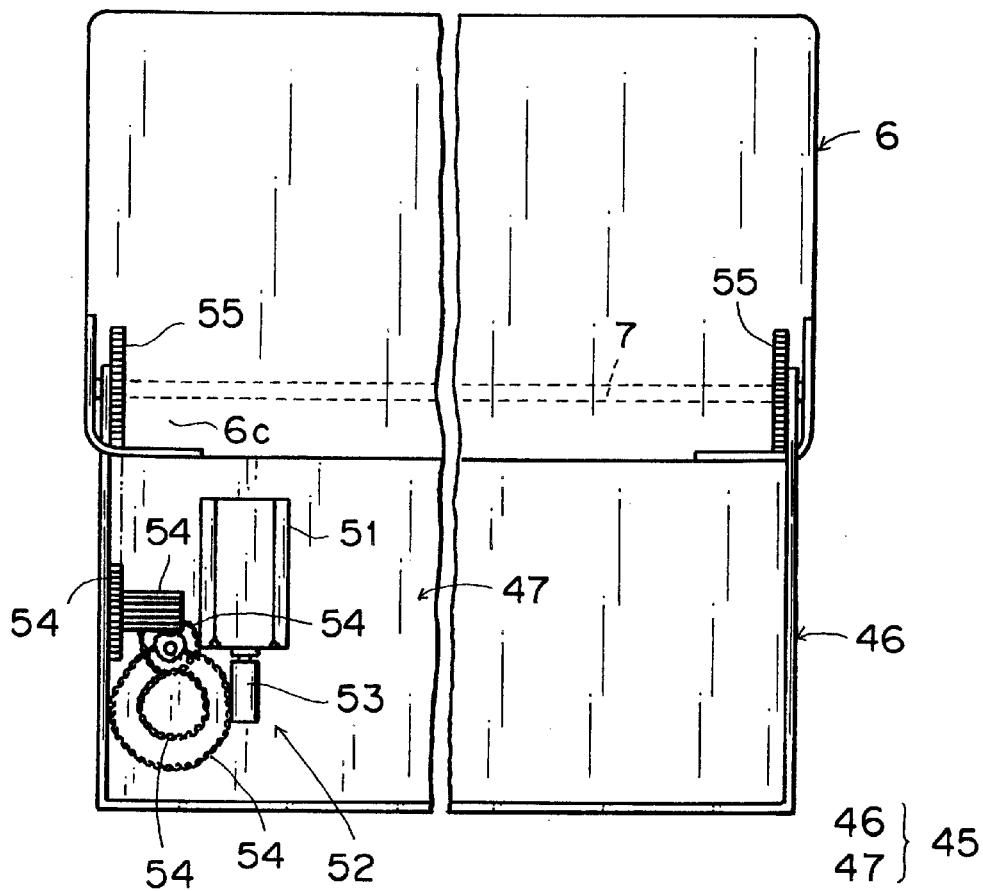
FIG. 19 is a plan view of a second driving mechanism and the second display unit of the display device according to the second embodiment.
Figure 20:
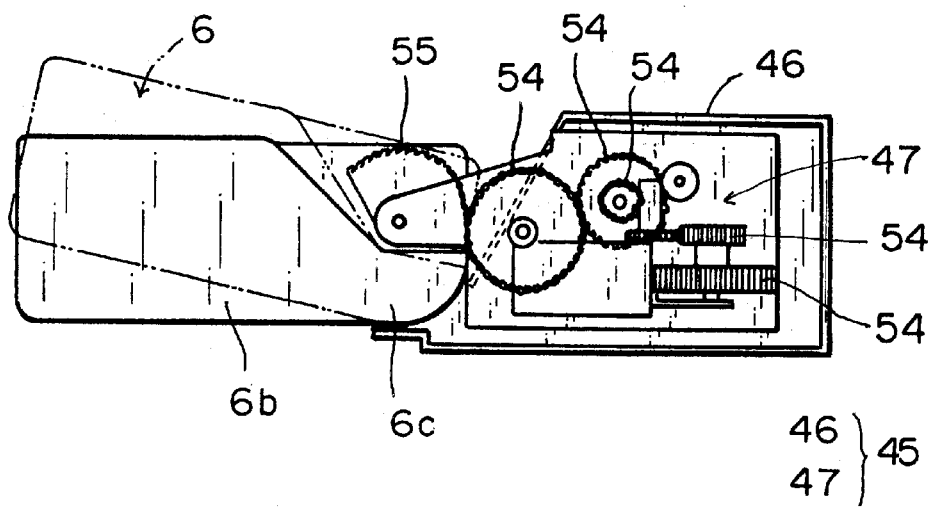
FIG. 20 is a left side view of the second driving mechanism and the second display unit of the display device shown in FIG. 19.

In this embodiment, as seen from FIGS. 9 to 17, a second driving mechanism 45 is attached to the bottom face of the enclosure 2. The second driving mechanism 45, as seen from FIGS. 19 and 20, is provided with a chassis member 46 and a second rotary supporting mechanism 47.

The chassis member 46 is attached to the lower portion of the opening portion 2a of the enclosure 2. The second rotary supporting mechanism 47 includes a second driving motor for rotation (rotary driving motor) 51 and a second rotary mechanism 52. The second rotary driving motor 51 is attached to the chassis member 46. The second rotary driving motor 51 is equipped with a worm gear 53 at its output shaft.

The rotary mechanism 52 includes a plurality of gears 54 which are in mesh with one another and a driving gear 55 coaxially attached to the above pivotal shaft 7. The driving gear 55 rotates together with the pivotal shaft 7. One of the plurality of gears 54 is in mesh with the worm gear 53 and another thereof is in mesh with the driving gear 55.

In the configuration described above, when the second rotary driving mechanism 47 makes e.g. a normal rotation of the second rotary driving motor 51, the second display unit 6 is rotated around the end 6c so that the display panel 3a is shifted from the state where it is oriented downward to the state where it is opposite to the front of an occupant section or the driver.

On the other hand, the second rotary supporting mechanism 47 makes e.g. a reverse rotation of the second rotary driving motor 51 so that the display panel 6a is rotated around the one end 6c from the state where it is opposite to the driver to the state where the it is oriented downward.

Figure 9:
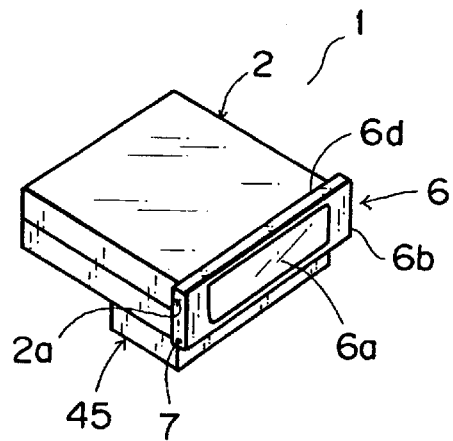
FIG. 9 is a perspective view of the state where the first display unit is loaded in the box in the display device according to the second embodiment of the invention.
Figure 10:
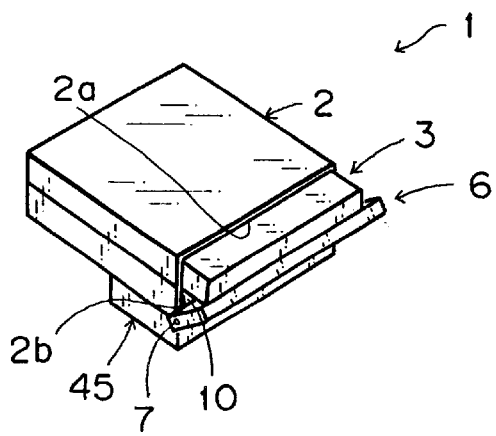
FIG. 10 is a perspective view of the state where the first display unit has been unloaded from the box of the display device according to the second embodiment.

In the configuration of the display device described above, in the state where the first display unit 3 is located at the above loading position, as shown in FIG. 9, the end face 6d of the second display unit 6 is opposite to the opening portion 2a. At this time, the display panel 6a is opposite to the driver and the end face 6d is in contact with the peripheral edge of the enclosure 2 constituting the opening portion so that the opening portion 2a is closed.

When the operation switch is operated, the driving motor for shifting 21 is rotated in a normal direction and the second rotary driving motor 51 is rotated in a reverse direction. Then, as seen from FIGS. 10 and 11, the first display unit 3 as well as the sub-chassis 11 is unloaded or discharged from the enclosure 2. Simultaneously, the second display unit 6 is rotated around the pivotal shaft 7 in a direction of opening the opening portion 2a until it is oriented downward.

Figure 11:
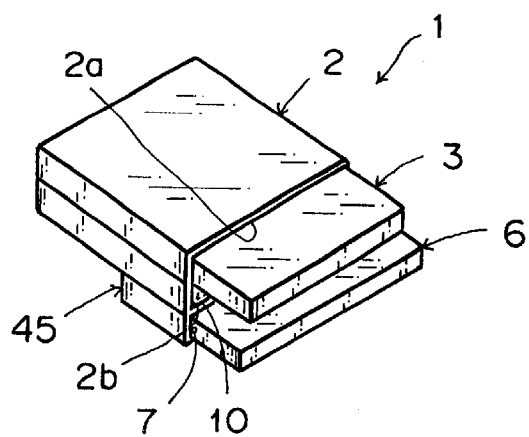
FIG. 11 is a perspective view of the state where the second display unit has been rotated when the first display unit is unloaded from the box of the display device according to the second embodiment.

As shown in FIG. 11, when the display panel 6a is oriented downward, the driving motor 21 stops. Incidentally, the driving motor 21, which is being driven in a normal direction, continues to unload the first display unit 3 from the enclosure 2.

As shown in FIG. 12, when the first display unit 3 is completely unloaded from the enclosure 2, the driving motor 21 stops. At this time, the display panel 3a of the first display unit 3 is oriented downward.

Figure 13:
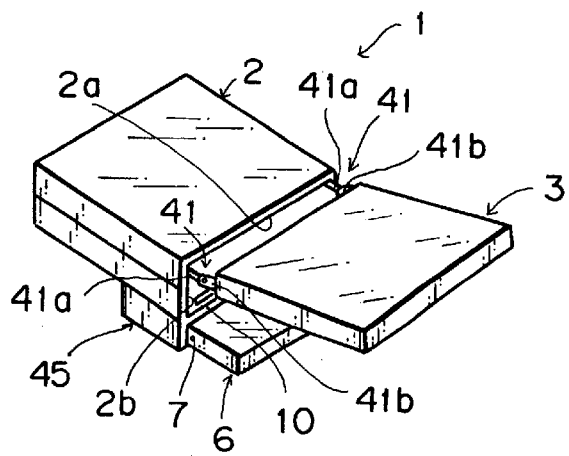
FIGS. 13 and 14 are perspective views of the state where the first display unit of the display device according to the second embodiment is being rotated, respectively.
Figure 14:
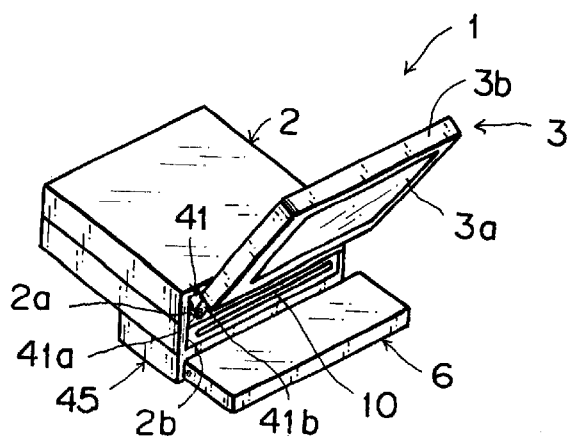

Thereafter, the first rotary driving motor 31 is rotated in the normal direction so that the first display unit 3 is rotated around the pivotal shaft 14 as shown in FIGS. 13 and 14. Thus, the display panel 3a is located at the viewing position where it is opposite to the front of an occupant or driver and the information on the display panel 3a is presented for the visual recognition of the driver.

When the display panel 3a is located at the viewing position, the first rotary driving motor 31 stops. Then, the second driving motor 51 of the second rotary supporting mechanism 47 is driven in the normal direction. Thus, as shown-in FIG. 16, the second display unit 6 is rotated around the pivotal shaft 7, i.e. end 6c until the display panel 6a is opposite to the driver from the state it is oriented downward.

Figure 17:
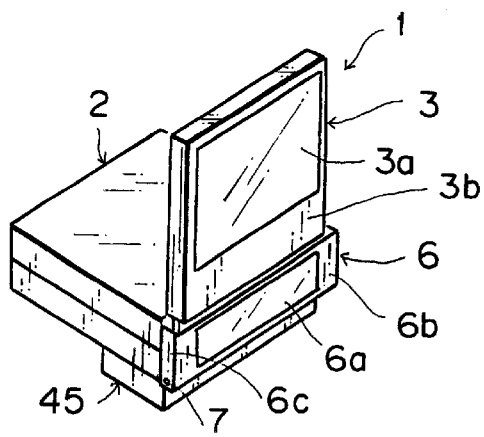
FIG. 17 is a perspective view of the state where the second display unit of the display device according to the second embodiment has been rotated to an angle easy to see.

As seen from FIG. 17, when the display panel 6a is located oppositely to the driver, the second driving motor for rotation 51 stops. In this way, the first and the second display unit 3 and 6 are located at the positions where the driver can visually recognize the information displayed on the display panels 3a and 6a.

When the operation is operated in the state where the display panels 3a and 6a are opposite to the driver, the second rotary driving motor 51 is driven in the reverse direction, for example.

Figure 16:
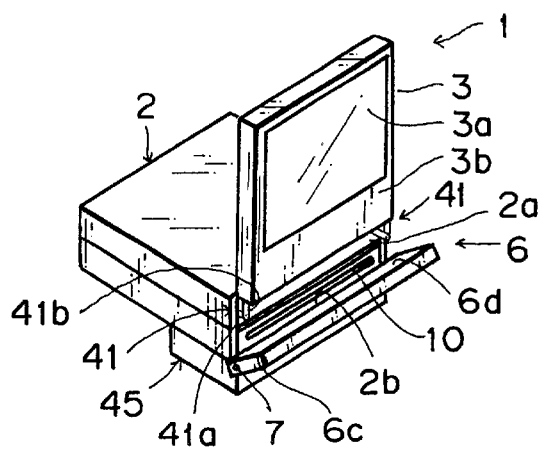
FIG. 16 is a perspective view of the state where the second display unit of the display device according to the second embodiment is being rotated.

Then, as shown in FIG. 16, the second display unit 6 is gradually rotated around the pivotal shaft 7 until the display panel 6a is oriented downward. In the meantime, the first display unit 3 is held at the viewing position.

Figure 15:
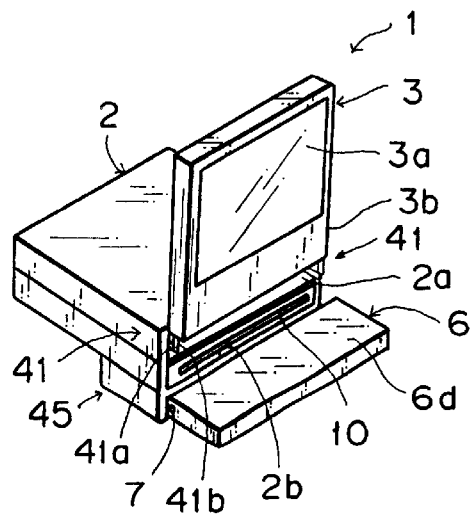
FIG. 15 is a perspective view of the state where the first display unit of the display device according to the second embodiment has been rotated to an angle easy to see.

As seen from FIG. 15, when the display panel 6a is oriented downward, the second rotary driving motor 51 stops. Then, The first rotary driving motor 31 is driven in the reverse direction. Then, as shown in FIGS. 14 and 13, the first display unit 3 is gradually rotated around the pivotal shaft 14 until the display panel 3a is oriented downward.

As seen from FIG. 12, when the display unit 3 has been rotated until the display panel 3a is oriented downward, the first rotary driving motor 31 stops. At this time, the second display unit 6 keeps the opening portion 2a opened. Thereafter, the driving motor for shifting 21 is driven in the reverse direction, for example. Then, as seen from FIGS. 11 and 10, the first display unit 3 is shifted into the enclosure 2.

When the first display unit 3 is loaded into the midpoint of the enclosure 2, the second rotary driving motor 51 is driven in the normal direction, for example. Thus, as seen from FIG. 10, the second display unit 6 is rotated around the pivotal shaft 7 in the direction of making the display panel 6a opposite to the driver.

When the first display unit 3 has been completely loaded in the enclosure 2, as seen from FIG. 9, the second display unit 6 is located so that the display panel 6a is opposite to the driver. At this time, the end face 6d of the second display unit 6 is opposite to the opening portion 2a so that the opening portion 2a is closed.

The display device 1 according to this embodiment provides the following advantages. When the first display unit 3 is being loaded in the enclosure 2, the second display unit 6 is located so that the display panel 6a is opposite to the driver. Therefore, when the first display unit 3 is not used, information can be displayed on the display panel 6a of the second display unit 6.

Therefore, a wide variety of items of information can be displayed. In addition, irrespectively of whether the first display unit 3 is located at the loading position or at the viewing position, the second display unit 6 can always display information. For this reason, the space for installing the display device can be used effectively.

Like the first embodiment, the display device according to this embodiment, the display units 3 and 6 are provided so that the first display unit 3 can be loaded from/into the enclosure and the second display unit 6 can be rotated around the end 6c. This permits a wider variety of items of information to be displayed, and the installing space to be limited and used effectively.

Further, while the first driving mechanism 9 shifts the first display unit 3 from the loaded position to the viewing position and vice versa, the second driving mechanism 45 rotates the second display unit 6 so that the opening portion 2a is opened. Therefore, the first display 3 can be surely loaded in/from the enclosure 2.

In the display device according to the first and the second embodiment of the invention, the display units 3 and 6 are adapted to rotate around their one ends 3c and 6c, respectively. However, the present invention can be applied to the display device in which after the display panels 3a and 6a are opposite to the front of an occupant section, at least one of them can be swung so that they are opposite to the driver.

What is claimed is:

1. A display device comprising:
   an enclosure;
   a first display unit provided so that it can be freely unloaded/loaded from/into said enclosure;
   a second display unit provided in front of said first display unit in a direction of unloading the first display unit from said enclosure.

2. A display device according to claim 1, wherein said enclosure has an opening portion through which said first display unit is loaded/unloaded, said second display unit includes a second display panel for displaying information and a second frame member for enclosing said second display panel so that when the first display unit is loaded in and unloaded from the enclosure, an end face of said frame member is opposite to said opening portion of the enclosure.

3. A display device according to claim 2,
   further comprising a first driving mechanism for driving said first display unit between a loading position where said first display unit is completely loaded in said enclosure and a viewing position where information is visually recognized by a driver,
   wherein
   said enclosure is provided with a pivotal shaft provided so as to extend widthwise at an edge of said opening portion;
   said second display unit is pivotally supported by said pivotal shaft in a state urged in a direction of causing said end face to close said opening and information on said display panel to be visually recognized; and
   when said first driving mechanism drives said first display unit from said loading position to said viewing position and vice versa, said first display unit pushes the said second display to rotate around said pivotal shaft in a direction of opening the said opening portion.

4. A display device according to claim 2, further comprising:
- a first driving mechanism for driving said first display unit between a loading position where said first display unit is completely loaded in said enclosure and a viewing position where information is visually recognized by a driver,
- a second driving mechanism for driving said second display unit around said pivotal shaft, wherein
- said enclosure is provided with a pivotal shaft provided so as to extend widthwise at an edge of said opening portion;
- when said first display unit is located at said loading position or said viewing position, said second display unit remains in a state where information on said display panel can be visually recognized; and
- when said first driving mechanism drives said first display unit from said loading position to said viewing position and vice versa, said second driving mechanism pushes the said second display unit to rotate around said pivotal shaft in a direction of opening the said opening portion from the state where said end face of said frame member is opposite to said opening portion of the enclosure.

5. A display device according to claim 3, wherein said first display unit includes a first display panel for displaying information and a first frame member for enclosing said first display panel;

said second display panel has a smaller size that of said first display panel; and when said first display unit is located on both loading position and viewing position, the second display unit remains in a state where information on said second display panel can be visually recognized.

6. A display device according to claim 4, wherein said first display unit includes a first display panel for displaying information and a first frame member for enclosing said first display panel; and said second display panel has a smaller size that of said first display panel.

* * * * *